United States Patent

Lewis et al.

[11] Patent Number: 4,899,284
[45] Date of Patent: Feb. 6, 1990

[54] WING LIFT/DRAG OPTIMIZING SYSTEM

[75] Inventors: George E. Lewis, Renton; Robert E. Thomasson, Seattle; David W. Nelson, Redmond, all of Wash.

[73] Assignee: The Boeing Company, Seattle, Wash.

[21] Appl. No.: 656,131

[22] Filed: Sep. 27, 1984

[51] Int. Cl.$^4$ .............................................. G06G 7/70
[52] U.S. Cl. ..................................... 364/435; 244/219
[58] Field of Search ................ 244/219; 416/23, 240; 364/435

[56] References Cited

U.S. PATENT DOCUMENTS

| | | | |
|---|---|---|---|
| 3,698,668 | 10/1972 | Cole | 244/44 |
| 3,885,758 | 5/1975 | Croswell, Jr. | 244/44 |
| 3,893,639 | 7/1975 | Croswell, Jr. | 244/44 |
| 3,930,626 | 1/1976 | Croswell, Jr. | 244/44 |
| 3,945,593 | 3/1976 | Schänzer | 244/77 D |
| 3,994,451 | 11/1976 | Cole | 244/44 |
| 3,994,452 | 11/1976 | Cole | 244/44 |
| 4,044,975 | 8/1977 | Blechen et al. | 244/181 |
| 4,053,124 | 10/1977 | Cole | 244/219 |
| 4,131,253 | 12/1978 | Zapel | 244/219 |
| 4,171,787 | 10/1979 | Zapel | 244/219 |
| 4,247,066 | 1/1981 | Frost et al. | 244/219 |
| 4,252,287 | 2/1981 | Zimmer | 244/219 |
| 4,261,537 | 4/1981 | Frosch | 244/181 |
| 4,285,482 | 8/1981 | Lewis | 244/207 |
| 4,296,900 | 10/1981 | Krall | 244/219 |
| 4,312,486 | 1/1982 | McKinney | 244/215 |
| 4,326,253 | 4/1982 | Cooper | 364/435 |
| 4,341,176 | 7/1982 | Orrison | 114/102 |
| 4,349,169 | 9/1982 | McAnally | 244/219 |
| 4,351,502 | 9/1982 | Statkus | 244/214 |
| 4,363,098 | 12/1982 | Buus et al. | 364/434 |
| 4,427,168 | 1/1984 | McKinney et al. | 244/214 |

Primary Examiner—Donald P. Walsh
Attorney, Agent, or Firm—Bruce A. Kaser

[57] ABSTRACT

A wing camber command system (28) is provided for calculating the optimum camber of a wing (52) during aircraft operation. The wing (52) has at least one movable leading edge surface (42, 44) and at least one movable trailing edge surface (46, 48, 50) for varying wing camber, while maintaining smooth upper surface contours. Flight conditions and aircraft parameters including aircraft speed (30), normal acceleration (32), weight (34), and the dynamic pressure of air (36) are sensed during the aircraft maneuver. An onboard computer (40) monitors the sensed conditions and parameters and calculates a coefficient of lift therefrom. The computer contains stored data indicating the desired positions for the leading and trailing edge surfaces necessary to achieve a wing camber that optimizes the wing lift/drag (L/D) ratio during aircraft operation. The computer uses this stored data to command optimum wing camber.

3 Claims, 3 Drawing Sheets

VARIABLE CAMBER WING PERFORMANCE IMPROVEMENT

WING LIFT/DRAG OPTIMIZING SYSTEM

The U.S. Government has certain rights in the invention disclosed herein pursuant to Gov. Contract No. F33615-78-C-3027.

TECHNICAL FIELD

This invention pertains to variable camber aircraft wings. More particularly, it pertains to an apparatus and method for commanding wing camber during aircraft operation, to optimize the wing lift/drag ratio throughout the aircraft flight envelope.

BACKGROUND ART

An aircraft wing is normally designed to have a lift/drag (L/D) ratio that is optimized for a particular flight condition. For example, many commercial aircraft are designed to cruise at a particular speed and altitude. The wings of such aircraft are designed so that they have a L/D ratio that is optimized for that design condition. Operation of such aircraft at off design flight conditions thus results in higher fuel consumption or reduced maneuvering performance than that which could otherwise be acheived. Optimization of L/D to achieve maximum performance becomes a substantial problem for the aircraft designer in aircraft that are subjected to wide variations in flight conditions, i.e., changes in speed, altitude, and normal acceleration. Most military aircraft are in this latter category, for example. While the present invention is concerned primarily with this latter case, the instant invention is also applicable to commercial aircraft types.

It is well-known that the L/D ratio of an aircraft wing may be altered by varying the chord-wise curvature or camber of the wing. In conventional wing designs, wing camber is designed in accordance with the particular flight conditions to which the wing will be subjected. By way of example, and referring now to FIG. 1, therein is shown optimum wing cambers for different flight conditions including what is commonly known in the art as high speed dash, cruise, and maneuver conditions. As can be seen, wing camber design for the high speed dash condition 10 is different from the camber for the cruise or maneuver conditions 11, 12. The camber for each wing 10, 11, 12 may be designed so that the L/D ratio is optimized for each respective condition. FIG. 1 shows the relationship of L/D for each wing camber 10, 11, 12. For a wing having variable camber capability that includes a smooth wing upper surface contour, it is possible to achieve the lift to drag L/D relationship indicated by the dashed line 16. The dashed line 16, therefore, represents an envelope of minimum drag or maximum L/D at any given flight condition which can be achieved by varying wing camber. It is beneficial to have an aircraft wing wherein the wing camber can be varied so that the aircraft always operates on the optimum L/D boundary (line 16 of FIG. 1) regardless of the flight condition. Operation along the boundary 16 minimizes aircraft drag and results in increased aircraft range and improvement in aircraft maneuver capability throughout the aircraft flight envelope.

To obtain the above-mentioned benefits, wings having variable camber capability have been designed. Typically, and referring now to the wing 21 in FIG. 2, such wings have at least one movable leading edge surface 22, and one movable trailing edge surface 24, wherein both surfaces 22, 24 are positioned relative to each other so that they can each be moved to vary wing camber while maintaining a smooth upper surface contour. The physical construction of such a wing is well-known in the art and has been described in various U.S. patents including: U.S. Pat. No. 4,351,502 issued to Frank D. Statkus on Sept. 28, 1982; U.S. Pat. No. 3,994,452 issued to James B. Cole on Nov. 30, 1976; U.S. Pat. No. 3,994,451 issued to James B. Cole on Nov. 30, 1976; U.S. Pat. No. 3,930,626 issued to Thomas L. Croswell on Jan. 6, 1976; and U.S. Pat. No. 3,698,668 issued to James B. Cole on Oct. 17, 1972. However, a system for commanding wing camber is not disclosed in these patents.

The present invention is directed towards providing a system for commanding a variable camber wing, to optimize wing L/D for varying flight conditions that may occur during a range of possible aircraft maneuvers and operations. This permits the wing to maintain an optimum L/D relationship like curve 16 shown in FIG. 1. Having such a system has many attendant advantages. For example, such a system may provide improved aircraft maneuverability, increased aircraft range, lower stall speed, improved wing buffet characteristics, and reduced aircraft fuel consumption.

DISCLOSURE OF THE INVENTION

The present invention provides a variable camber wing command system for varying wing camber to optimize wing lift/drag (L/D) during the operation of an aircraft. The invention provides such a system for an aircraft wing having at least one movable camber control surface mounted to the wing. The invention includes a means for sensing various flight conditions and parameters during aircraft operation. Such conditions and parameters include aircraft speed, aircraft normal acceleration, aircraft weight parameters, and the dynamic pressure of air. A calculating means, operatively connected to the sensing means, receives the sensed conditions and parameters from the sensing means. During aircraft operation, the calculating means calculates an aircraft wing coefficient of lift from the sensed normal acceleration, weight parameters, and sensed dynamic pressure. The calculating means than calculates a desired position for the camber control surface to optimize wing L/D. To make this calculation, the calculating means uses the calculated coefficient of lift, sensed aircraft speed, and sensed dynamic pressure along with stored data that indicates control surface optimum position for such sensed and calculated conditions. In preferred form, the calculating means will be in the form of an aircraft onboard computer. The computer will include a data means for providing such stored data.

The invention of the present case is particularly well-suited for a variable camber wing having at least one camber control surface mounted to a leading edge portion of the wing, and also having at least one camber control surface mounted to a trailing edge portion of the wing. The wing may also have a first and second means for moving the first and second surfaces, respectively, and for holding each surface in a selected position. The surfaces are positioned on the wing relative to each other so that they may be moved to cooperate with each other to vary wing camber. Such cooperation does not, however, mean that both of the surfaces are moved in combination to vary wing camber. In accordance with the instant system, each surface is independently controlled relative to the other. For example, the onboard aircraft computer may include separate data files indicating the optimum position for each surface of the basis of the calculated coefficient of lift, sensed aircraft speed, and sensed dynamic pressure. Each surface may be moved or not moved independently to vary wing camber. The relative position of the first and second surfaces with respect to each other permits them to cooperate with each other as may be needed to vary wing camber. It may be possible, however, to vary wing camber by causing only one of the surfaces to change its position. The computer may cause such operation to be performed depending on that data which is stored for each respective surface.

The sensing means senses the above-mentioned flight conditions and parameters and produces electrical signals that indicate their magnitude. The calculating means or computer is connected to the sensing means for receiving such electrical signals therefrom. In a system having more than one camber control surface, the computer then calculates the optimum position for each surface and generates electrical command signals to the means for moving such surfaces. The instant system may further include a first filtering means, operatively positioned between the sensing means and the computer, for filtering electrical noise and for preventing signal aliasing within the computer. The system may also include a second filtering means, operatively positioned between the computer and the surface moving means, for electrically filtering the command signals from the computer before they are received by the surface moving means. The second filtering means should be designed to have a particular frequency response (band-pass) characteristic so that the instant system will minimally effect the short period and phugoid characteristics of the particular aircraft upon which the system is used. Such second filtering means also would minimize the effect of the instant system on the flying qualities (pilot rating) of the aircraft.

BEST MODE FOR CARRYING OUT THE INVENTION

Figure 1:
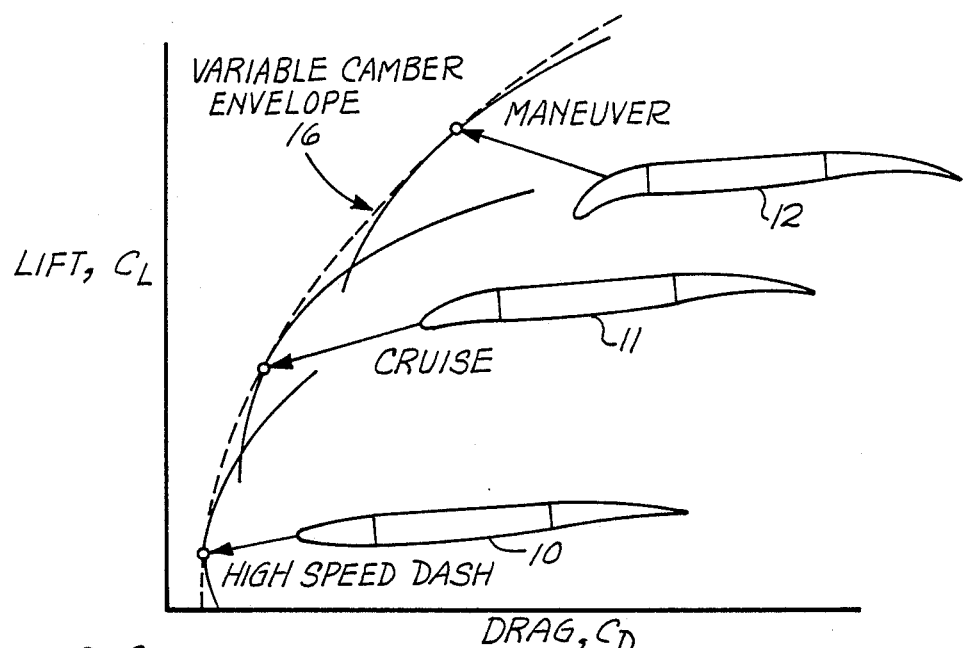
FIG. 1 is a schematic drawing showing differences in wing camber optimization for various flight conditions.
Figure 2:
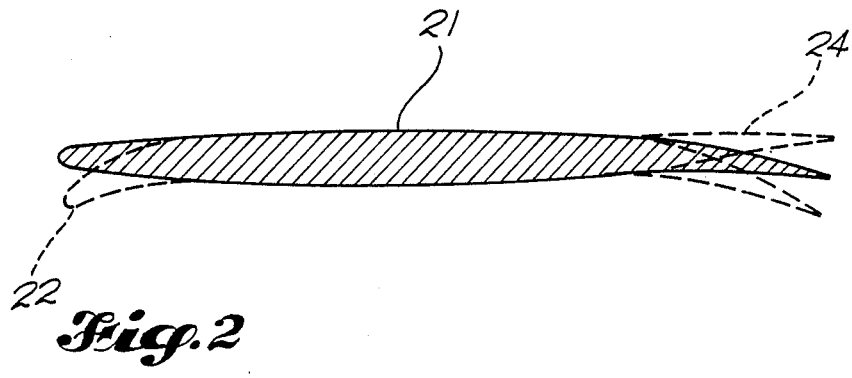
FIG. 2 is a schematic drawing of a variable camber wing showing movable leading and trailing edge surfaces.
Figure 3:
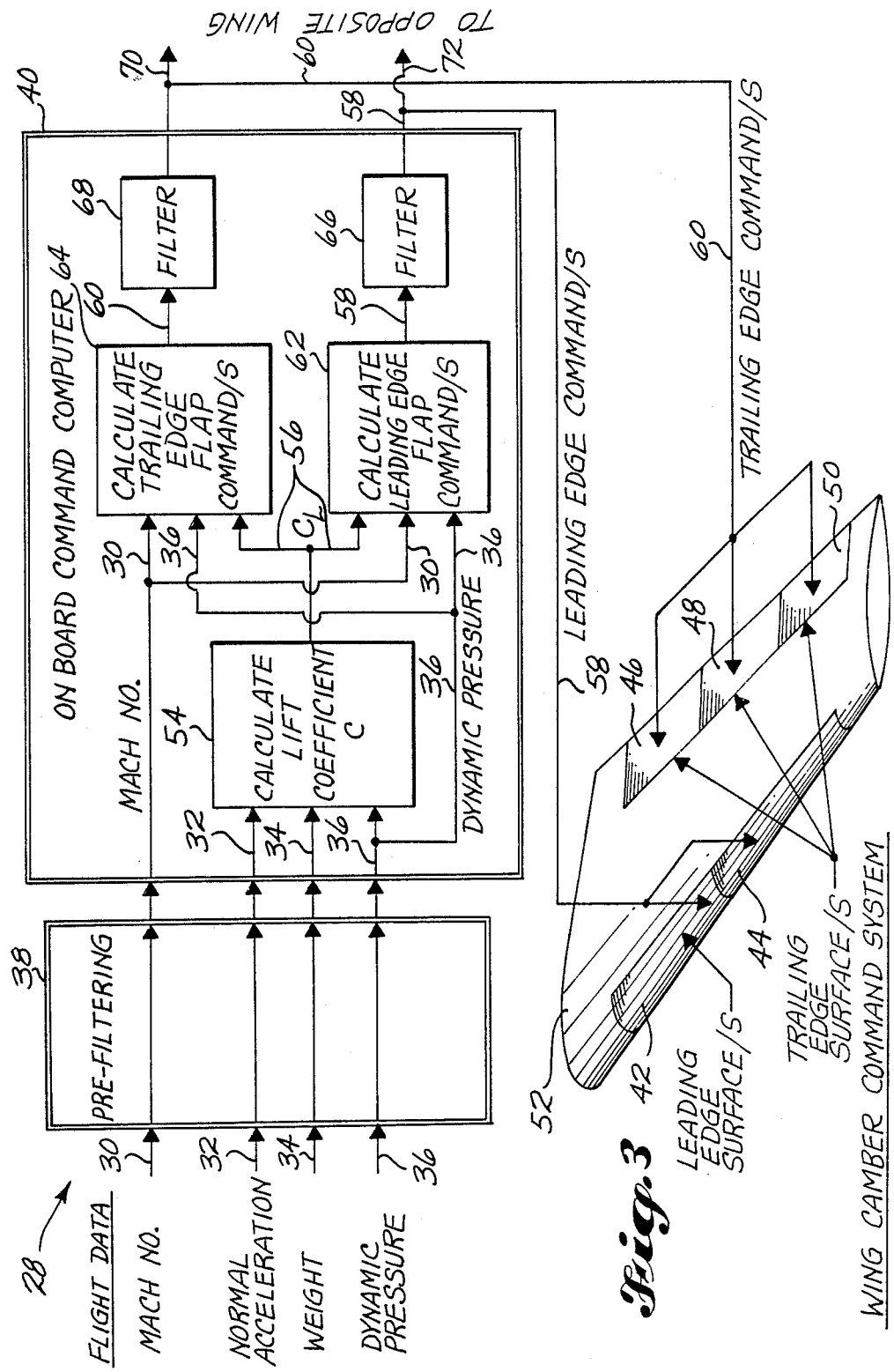
FIG. 3 is a schematic diagram showing the instant system and how it controls a variable camber wing.

Referring now to FIG. 3, therein is shown a camber control system 28 constructed in accordance with a preferred embodiment of the present invention. In preferred form, during aircraft operation certain flight conditions and parameters including Mach number (aircraft speed) 30, aircraft normal acceleration 32, aircraft weight parameters 34, and the dynamic pressure of air 36 are determined by various sensors located onboard the aircraft on which the system 28 is located. None of these sensors are shown in the drawings, however. Such sensors would provide electrical signals indicating the magnitude of the various conditions and parameters which they represent. The signals would be processed by a prefilter 38, and then transmitted to an onboard command computer 40. The onboard command computer 40 includes both a calculating and a memory portion that uses the flight condition and parameter signals 30, 32, 34, 36 to calculate the desired positions for the leading edge surfaces 42, 44, and for the trailing edge surfaces 46, 48, 50, which are all mounted to a wing 52. Such desired positions optimize the L/D ratio of the wing 52 during operation of the aircraft, or during particular aircraft maneuvers. The flight conditions 30, 32, 34, 36 are continually sensed during aircraft operation, with appropriate changes in surface positions being made in accordance with changes in the flight conditions.

The onboard computer 40 utilizes the normal acceleration signal 32, the aircraft weight signal 34, and the dynamic pressure signal 36 to calculate a coefficient of lift for the aircraft. This calculation is indicated schematically by the block 54 in FIG. 4. In general, the coefficient of lift is calculated in accordance with the $$C_L = \frac{N_Z W}{\bar{q} S}$$

Wherein:
$C_L$ = Coefficient of Lift
$N_Z$ = Normal Acceleration
W = Aircraft Weight
$\bar{q}$ = Dynamic Pressure
S = Reference Area The calculated coefficient of lift signal 56 is utilized by the computer along with the Mach No. (aircraft speed) signal 30 and the dynamic pressure signal 36 to calculate the desired position for each of the leading and trailing edge surfaces. In preferred form, calculations for the leading edge surfaces 42, 44 are made separate from calculations for the trailing edge surfaces.

Stored within the onboard computer 40 is a data memory bank that includes the desired position for each of the leading and trailing edge surfaces 42, 44, 46, 48, 50 for a range of values of calculated coefficients of lift, sensed aircraft speeds, and sensed dynamic pressures, all of which may occur during a range of possible aircraft operations. For example, such data may be obtainable by conducting wind tunnel tests of a variable camber wing for a particular aircraft on which the system of the present case is to be used. Such wind tunnel tests have been recently conducted for a variable camber wing on a fighter type aircraft, wherein optimum control surface position data derived from the tests can be found in a publication of the Boeing Company of Seattle, Washingtgn, wherein such document is entitled: Boeing Document D365-10086-1, "Software Requirements Specification for AFTI/F-111 MAW Automatic Flight Control System." Rev. G, August 1984. Such document is soon to be published by the U.S. Airforce pursuant to contract with the Boeing Company.

It is believed that the data generated by the wind tunnel tests indicate the desired positions for each individual leading edge and trailing edge surface 42, 44, 46, 48, 50, to vary wing camber to optimize wing L/D during the range of possible operations of the particular aircraft. Therefore, a separate data memory bank may be created and stored in the computer 40 for each leading edge 42, 44, and each trailing edge 46, 48, 50 surface.

In general, the computer 40 uses the calculated lift coefficient 56, and the sensed Main number 30 and dynamic pressure 36 to search its data memory banks for similar conditions stored therein. Once such conditions are found, the computer then reads from memory the desired leading and trailng edge positions associated with such conditions. Such computer operation for the leading 42, 44 and trailing edge surfaces 46, 48, 50 is schematically indicated by blocks 62 and 64 in FIG. 3. One set of command signals 58 may be generated for the leading edge surfaces 42, 44, and another set of command signals 60 may be generated for the trailing edge surfaces 46, 48, 50. It should be appreciated that whereas only a single wing 52 is shown in FIG. 3, the command signals 58, 60 would be used to command corresponding surfaces on another wing located on the opposite side of the aircraft in order to maintain symmetric operation. Such commands to another wing (not shown in the drawing) are indicated generally by arrows 70 and 72.

In preferred form, command signals 58, 60 are transmitted through filters 66, 68 before they are received by the leading and trailing edge surfaces. The filters 66, 68 may each have a particular bandpass characteristic that minimizes the effect of the system 28 on the short period and phugoid characteristics of the aircraft. It is to be understood that the bandpass characteristic of the filters 66, 68 will be unique to the aircraft upon which the system 28 is utilized. The filters may also minimize the effect of the instant system on the flying qualities (pilot rating) of the aircraft.

After filtering, the command signals 58, 60 are received by the leading and trailing edge surfaces 42, 44, 46, 48, 50. In preferred form, the leading and trailing edge surfaces are moved by actuators (not shown in the drawings) housed within the envelope of the wing 52. The leading and trailing edge surfaces and their actuators may be constructed so that the wing 52 has a smooth and continuous upper surface. Actuators and surfaces of this type are well-known in the art, and have been specifically taught in various United States patents including: U.S. Pat. No. 4,351,502 issued to Frank D. Statkus on Sept. 28, 1982; and U.S. Pat. Nos. 3,994,451 and 3,994,452, issued to James B. Cole on Nov. 30, 1976.

The system 28 shown in FIG. 3 illustrates a camber control system for a wing 52 having a plurality of leading and trailing edge control surfaces. However, it should be appreciated that the number of control surfaces may vary. Data tables or files may be developed for wings having variable numbers of control surfaces by means of appropriate wind tunnel testing.

Figure 6:
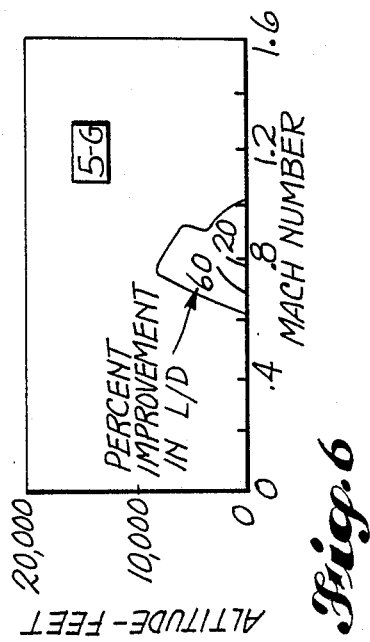
FIG. 6 is a graph like FIGS. 4 and 5 but shows predicted L/D improvement for a five "g" aircraft maneuver.
Figure 5:
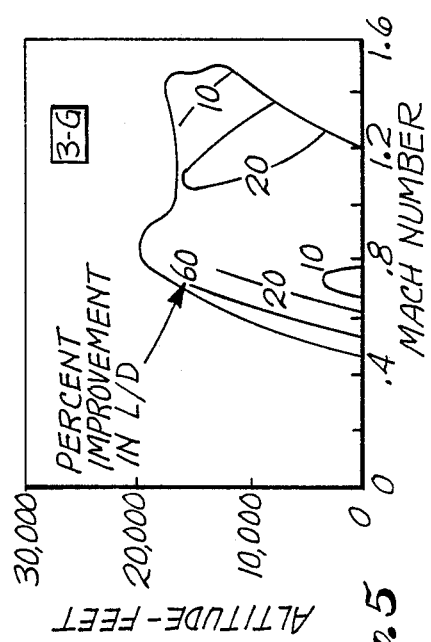
FIG. 5 is a graph like FIG. 4, but shows predicted L/D improvement for a three "g" aircraft maneuver.
Figure 4:
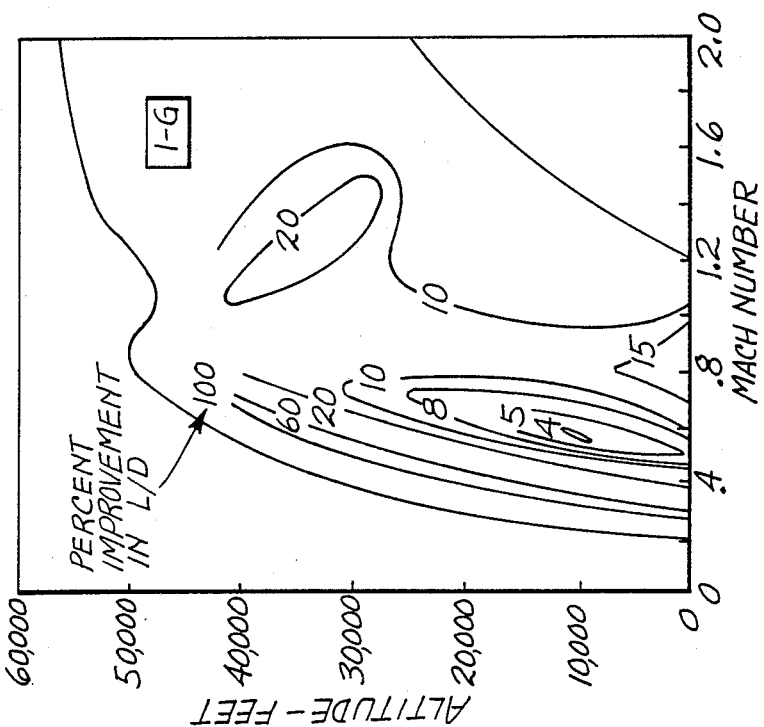
FIG. 4 is a graph showing predicted improvements in wing lift/drag L/D ratio that may be achieved by the instant system for a one "g" aircraft maneuver.

Improvements in wing performance caused by using the present system 28 have been analytically indicated for a variable camber wing used on a fighter type aircraft having a single leading edge and three trailing edges FIGS. 4–6 show the predicted improvement of the L/D ratio for such a wing for a variety of sustained "g" maneuvers. FIG. 4 shows the wing lift envelope for a one "g" maneuver, and FIGS. 5 and 6 show the wing lift envelope for three and a five "g" maneuvers, respectively. Each of these figures shows the percent improvement in L/D as a function of both altitude and Mach number. As can be seen, at relatively low Mach numbers the percent improvement in L/D may be as a high as 100% for a one "g" maneuver. For three and five "g" maneuvers as much as a 60% improvement in L/D may be obtained.

It is to be understood that modifications and changes to the above system would be obvious to a person skilled in the art without departing from the spirit and scope thereof. It is also to be understood that the scope of the present invention is to be limited only by the appended claims which follow, in accordance with the well-established doctrines of patent claim interpretation.

What is claimed is:

1. For an aircraft that includes a wing having at least one leading edge surface and at least one trailing edge surface, wherein said surfaces are movable to vary said wings, camber, said aircraft being subject to variations in flight conditions that include changes in aircraft speed, altitude and normal acceleration, all of which are substantially caused by aircraft in-flight maneuvers, an apparatus for continuously optimizing the L/D ratio of said wing during said maneuvers, comprising:

means for continuously sensing actual values of aircraft, speed, aircraft normal acceleration, aircraft weight, and air dynamic pressure while said aircraft is in-flight, an on-board computer, operatively connected to said sensing means for continuously receiving said sensed speed, acceleration, weight and dynamic pressure therefrom, said computer being operative to continuously calculate a coefficient of lift from said sensed acceleration, weight and dynamic pressure, with said computer including a data memory bank having stored test data that indicates the desired optimum position for each of said surfaces for optimizing said wing's L/D ratio given certain values of coefficient of lift, aircraft speed, and dynamic pressure, wherein said computer is operatively connected to said leading and trailing edge surfaces to move said surfaces, and wherein said computer is further operative to continuously obtain from said data memory bank the optimum position of said surfaces by compairing said test data with said calculated coefficient of lift, said actual aircraft speed and said actual dynamic pressure, and to accordingly adjust said surfaces to said optimum position in a continuous manner during said maneuvers.

2. The apparatus of claim 1, wherein said computer includes a separate data memory bank for each of said leading and trailing edge surfaces, to continuously calculate the optimum position for each of said surfaces independently from the other during said maneuvers.

3. The apparatus in accordance with claim 2, wherein said wing includes an upper surface having a smooth and continuous surface contour.

* * * * *

UNITED STATES PATENT AND TRADEMARK OFFICE
CERTIFICATE OF CORRECTION

PATENT NO. : 4,899,284
DATED : February 6, 1990
INVENTOR(S) : George E. Lewis, Robert E. Thomasson and David W. Nelson It is certified that error appears in the above-identified patent and that said Letters Patent is hereby corrected as shown below:

Col. 3, line 3, "of the" should be -- on the --.
Col. 4, lines 57 and 58, "Washingtgn" should be
    -- Washington --.
Col. 5, line 5, "Main" should be -- Mach --.
Col. 5, line 60, there is a period after "edges".

Claim 1, col. 6, line 21, "wings," should be -- wings' --.
Claim 1, col. 6, lines 27 and 28, "aircraft, speed" should be
    -- aircraft speed --.
Claim 1, col. 6, line 49, "compairing" should be
    -- comparing --.

Signed and Sealed this

Fifth Day of November, 1991

*Attest:*

HARRY F. MANBECK, JR.

*Attesting Officer*  *Commissioner of Patents and Trademarks*